Nov. 15, 1949  D ATLAS  2,487,778
AUTOMATIC ALTIMETER SETTING INDICATOR AND TRANSMITTER
Filed Jan. 29, 1948  3 Sheets-Sheet 1
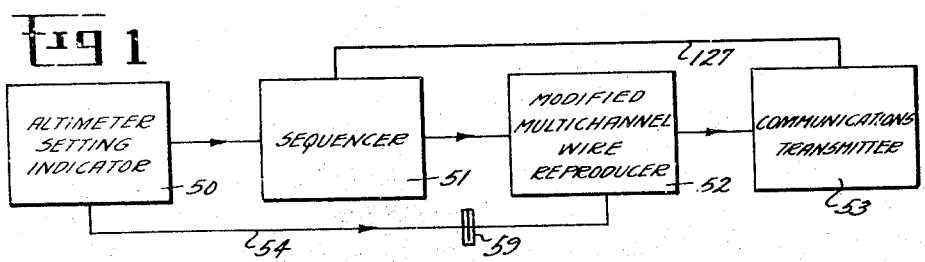
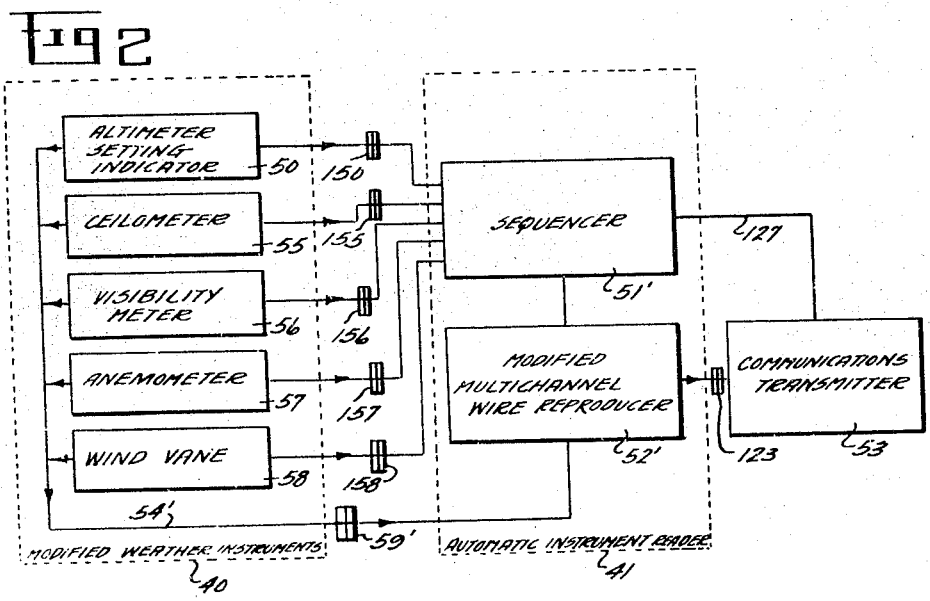
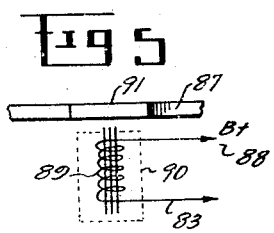
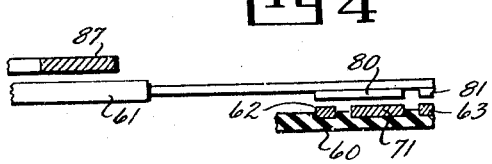
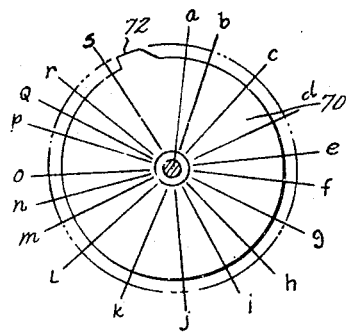
INVENTOR.
DAVID ATLAS
BY
ATTORNEYS

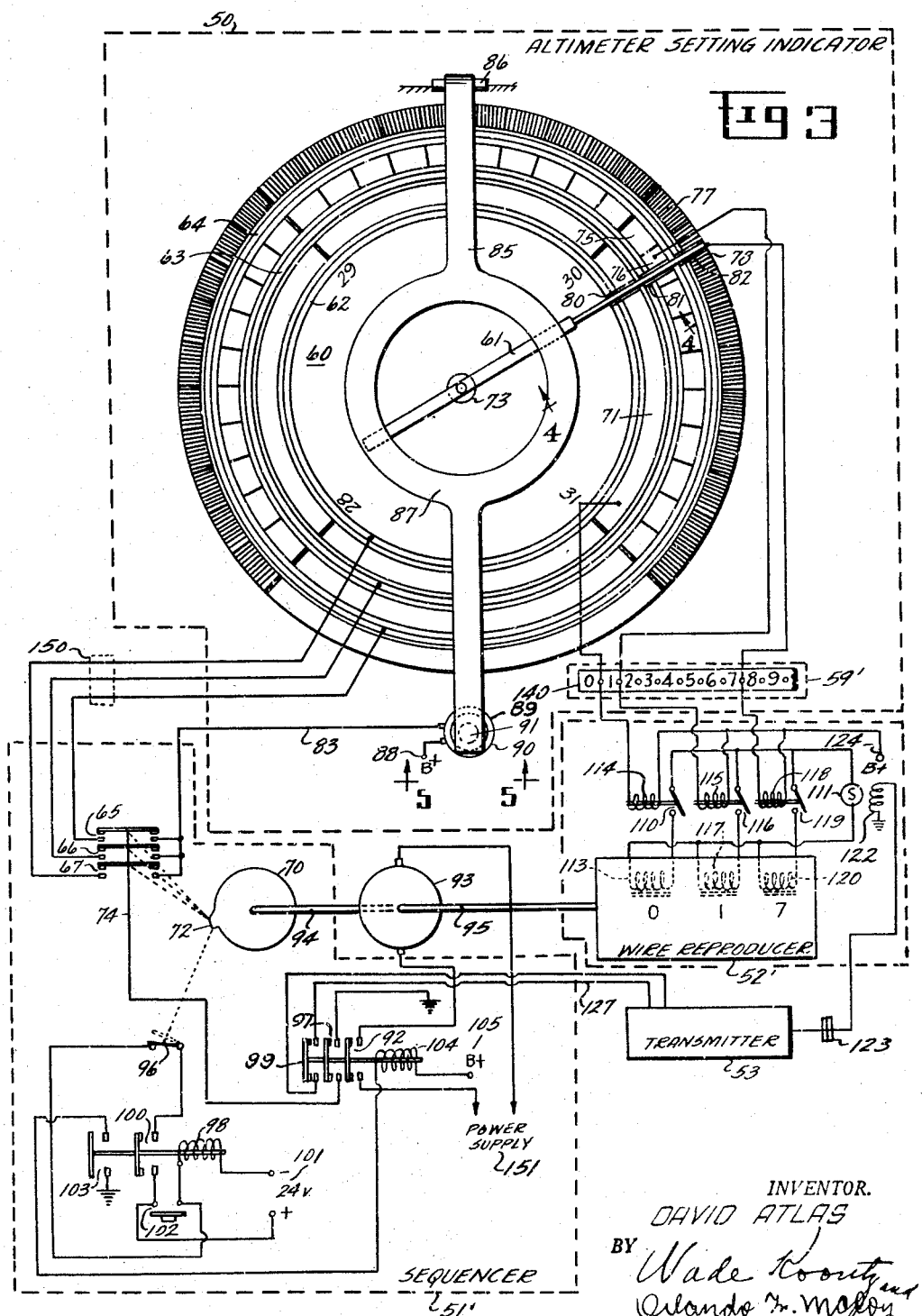

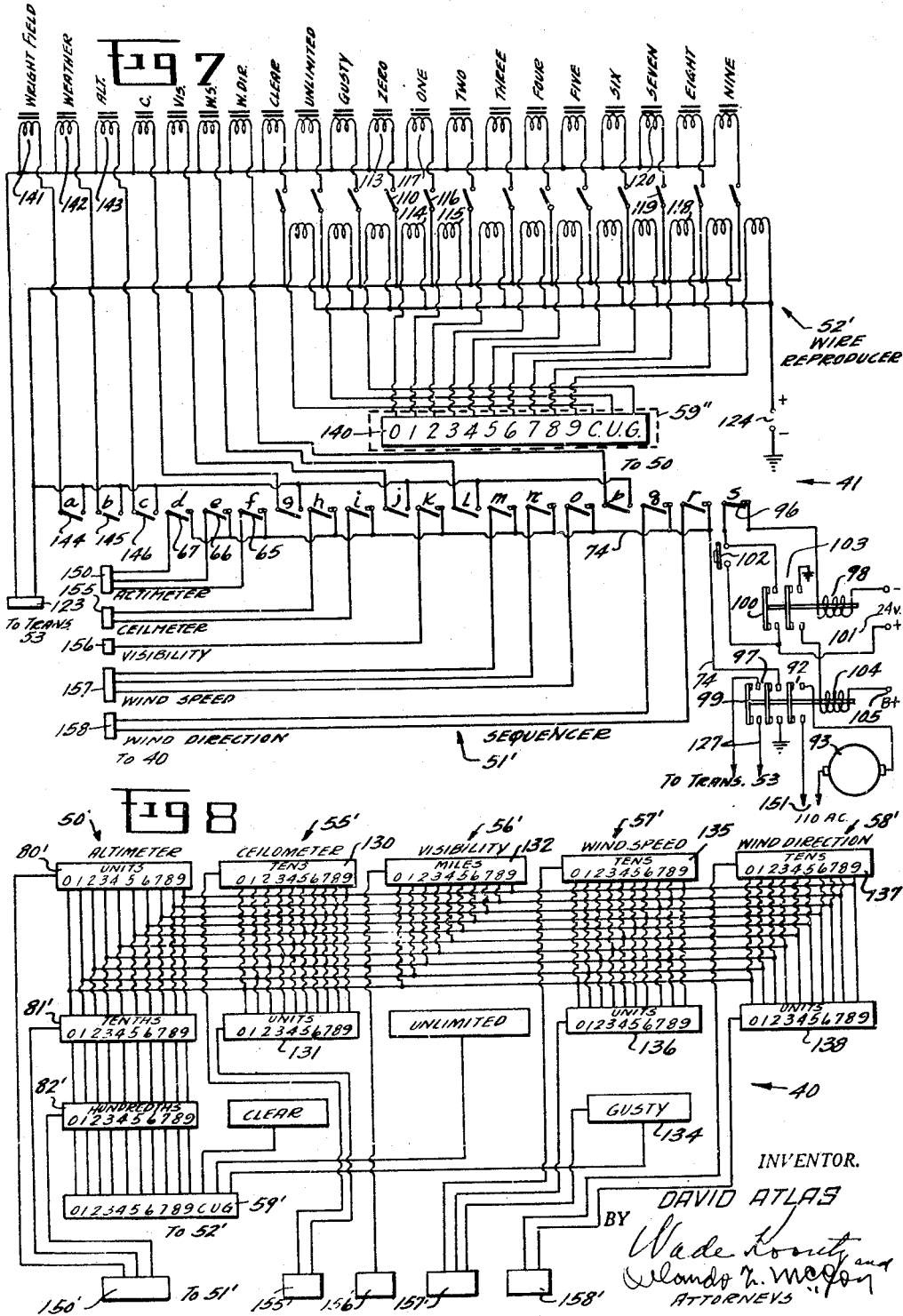

Patented Nov. 15, 1949

2,487,778

UNITED STATES PATENT OFFICE 2,487,778

AUTOMATIC ALTIMETER SETTING INDICATOR AND TRANSMITTER

David Atlas, Brooklyn, N. Y.

Application January 29, 1948, Serial No. 5,159

7 Claims. (Cl. 177—380)

(Granted under the act of March 3, 1883, as amended April 30, 1928; 370 O. G. 757)

The invention described herein may be manufactured and used by or for the Government for governmental purposes without payment to me of any royalty thereon.

This invention relates to electrically operated, automatic intelligence transmitting systems or devices and more particularly to such an intelligence transmitting means for use at ground level as a beacon installation or at an airport as applied to homing operations.

During the flights of airplanes along established routes in the past, considerable aggregate loss in lives and property has been caused over rough and mountainous terrain due to the absence of accurate flight information, as for example elevational data at unequipped obstacles, high ridges, peaks and the like along the route. Losses of this general type that have occurred in the past along mail and passenger routes over mountainous regions are believed to be avoidable in the future by operation of the present invention.

The present invention is directed toward the future avoidance of losses by providing a device adapted for being mounted as a beacon upon an equipped obstacle, such as a dangerous mountain ridge or peak or upon any high promontory along the flight course. The device is adapted to be attended or unattended by human agency as preferred, although periodic checking of the accuracy of the operation of the equipment is an essential in either type of installation. When unattended, the device may be caused to broadcast its report only upon the receipt of an actuating signal, thereby conserving electrical energy used in the broadcasting operations and hence extending the time between the replacing of energy supplying equipment, or the device may broadcast its report repetitiously in a desired manner, as by the operation of clockwork or the like.

During landing operations at an airport it has been common practice in the past for landing information to be transmitted orally by the use of audio radio equipment between a pilot making an aircraft homing operation and a radio operator on the ground at the landing field. During these operations certain types of information is recurrent in the sense that it is requested by every pilot approaching the field for a landing.

In a homing operation, the airplane pilot speaks into a microphone and requests orally of the operator on the ground at the landing field certain information that he needs to make a safe and accurate landing. In answering the pilot, the ground operator speaks into a microphone and gives the airplane pilot orally the information that he has requested. The uniform pattern of information requested and so supplied normally includes the name of the field; weather conditions at the field; instrument readings at ground level at the field, such as the barometric pressure or altimeter reading from which the airplane pilot may set the altimeter in his plane as a preparatory measure to making a safe landing; the ceiling, visibility, wind direction and wind speed at ground level and such other related information as is particularly needed by the pilot for him to accomplish a safe and accurate landing operation. The present invention is broadly a system and a device for supplying to an airborne pilot in oral form and with a high degree of accuracy, recurrent information needed by him in flight or during a homing operation.

As the pilot approaches a field in a homing operation it is necessary that he have an accurate ground level altimeter reading for his use in setting the altimeter in his airplane so that he may accomplish a smooth landing at ground level. The receipt by the airplane pilot of information of this type is essential for his own safety and for the safety of his passengers and his plane during the landing operation. Since the altimeter is a barometric device it must be corrected from time to time for variations in atmospheric pressure which occur with changes in temperature and hence in weather conditions as well as with changes in elevation.

Aircraft traffic is controlled by assignments of flight altitudes and spacing of aircraft. This traffic control is of importance in avoiding collisions, particularly at congested landing fields. This traffic control also applies to travel along popular routes. In the interests of optimum safety and performance, the periodic checking of altimeter settings and the reception by the pilot of other necessary flight information is of considerable importance.

For the purpose of disclosing or describing a representative operative embodiment of the present invention, an electrically operated automatic intelligence transmitting device for use in ground-air communication during, for example, a landing operation and accomplishing beacon or field identification, an altimeter setting report and the like, from an airport ground station to a homing pilot is presented herein as being an illustrative adaptation of the present invention.

The disclosed device for accomplishing the stated result is essentially an automatically operating instrument having an indicator arm so modified as to adapt it as an operative component in an electrical circuit coupled with a wire recorder applying its output to a transmitter as audio modulation on a carrier that is to be intercepted by an airborne pilot in the form of spoken words imparting to the pilot accurate instrument readings at the ground level and such other information as will supply his needs.

An object of the present invention is to provide a system for intercommunication in the transmission of instrument readings substantially without requiring the intervention of a human operator in accomplishing the transmission.

Another object is to provide an instrument reading and announcing device that is substantially independent of the human factor in the accuracy of its operation when properly adjusted.

A further object is to provide an instrument reading and announcing system that is capable of a high degree of accuracy and promptness in reading, transmitting and announcing an instrument reading at a point remote from where it was taken.

A further object is to provide ground apparatus for use by an airplane pilot in flight and in homing operations, that may be started from the air or at the ground as preferred, and that imparts to the homing pilot accurate information of a recurrent nature such as beacon or field identification, altimeter readings at ground level, wind speed, wind direction, visibility and the like, substantially at the instant the request is made.

With the above and other objects in view that will be apparent from the following description, an illustrative embodiment of the present invention, particularly as applied to a barometric instrument or altimeter reading announcing device for use at airports, is shown in the accompanying drawings, wherein:

Fig. 1 is a block circuit diagram that embodies the present invention and that indicates sequential electrical equipment adapted for reporting automatically and orally altimeter settings from a ground position;

Fig. 2 is a circuit block diagram that is an expansion of the diagram shown in Fig. 1 in that it is of multi-channel type;

Fig. 3 is a fragmentary structural and circuit diagram comprising an altimeter shown in plan view associated in simplified form and in a sequential operative relationship with electronic equipment presented in block diagram form in Fig. 1;

Fig. 4 is an enlarged fragmentary sectional view taken from the line 4—4 in Fig. 3;

Fig. 5 is an enlarged fragmentary elevational view, partly diagrammatic, taken from the line 5—5 in Fig. 3;

Fig. 6 is an enlarged plan view of a sequential cam that consecutively closes sequential contacts shown in Figs. 3 and 7;

Fig. 7 is a fragmentary circuit diagram of the connections in a modified multi-channel wire reproducer and sequencer shown in block diagram form in Fig. 2; and Fig. 8 is a circuit diagram of a system of electrical junctions and connections for a plurality of modified weather instruments shown in block diagram in Fig. 2.

A ground installation embodying the present invention as applied to an altimeter setting indicator responsive to signal from airborne radio equipment is shown in block diagram form in Fig. 1 of the accompanying drawings. The equipment shown may be installed on a dangerous ridge, peak or the like, in rough terrain to warn a pilot of a dangerous promontory along his route or flight course, or it may be installed at an airport for use by pilots approaching the field or airport in the making of homing operation.

The apparatus shown in Fig. 1 comprises an instrument, such as an altimeter setting indicator 50 presenting separate outputs to a sequencer 51 and to a modified multi-channel wire reproducer 52. The altimeter 50 is connected through lead 54 and connector 59 to the reproducer 52. The output from the sequencer 51 is applied to both the wire reproducer 52 and, through a lead 127 to a transmitter 53. The wire reproducer 52 passes its output to the communications transmitter 53.

Operatively, when a pilot transmits an apparatus actuating signal to a beacon on an equipped obstacle or to a landing field at both of which places the apparatus shown in Fig. 1 is established, the apparatus actuating signal triggers into action an instrument such as the altimeter setting indicator 50 and thereby actuates the remainder of the system at the ground station. The resulting operation of the system is initiated almost instantaneously after the actuating signal is received at the ground station. The apparatus shown in Fig. 1 may be attended or unattended depending upon its components. Where unattended the apparatus may respond to an actuating signal in a usual manner, such as by being applied to a suitable channeling circuit, not shown, or the apparatus may broadcast periodically or repetitiously as by the use of clockwork, not shown, or the like. Where the apparatus is attended, response to a request from an airborne pilot may be made by the manual depression of a button or by the closing of a switch at the ground station or the like.

The origin of intelligence from the altimeter setting indicator 50 preparatory to its transmission is sequentially spaced in order and in time by operation of the sequencer 51 and is applied by the altimeter setting indicator 50 to the modified multichannel wire reproducer 52 for transmission as audio modulation of a carrier transmitted from the communications transmitter 53. In short, when an aircraft pilot sends an actuating signal to the apparatus shown and positioned on the ground, he receives back in spoken words the setting of an instrument part of the apparatus such as the barometric pressure or the altimeter setting at the ground level where the apparatus shown in Fig. 1 is positioned without the necessity of human interjection between the sending of the actuating signal by the pilot and, in response thereto, his receipt of the desired information. The apparatus shown in Fig. 1 is a simple system supplying to a pilot the single instrument information of an altimeter or barometer reading at ground level. The circuit shown in block diagram form in Fig. 1 is included in the circuit and apparatus shown in Fig. 3 of the drawings with respect to which its operation is more fully described.

The circuit block diagram shown in Fig. 2 is that of a ground installation essentially resembling that shown in Fig. 1 adapted for transmitting a desired number of multiple readings or pieces of information from a desired plurality of instruments. The apparatus shown in Fig. 2 comprises broadly a set of modified weather instruments 40 coupled to an automatic instrument reader 41 that applies its output to a communications transmitter 53 for transmission to an interrogating pilot. The relationship between the components that are common to both Figs. 1 and 2 is indicated by the use of numerals that are common to both figures but the more distinct of which are primed in Fig. 2.

The modified weather instruments 40 comprise a desired plurality of instruments such as an altimeter setting indicator 50, a ceilometer 55, a visibility meter 56, an anemometer 57, a wind vane 58 and the like, that are connected separately by connectors 150, 155, 156, 157, 158, etc. respectively, to a sequencer 51'. These instruments also are connected by a conductor or cable 54' through a connector 59' into a modified multichannel wire reproducer 52' in the automatic instrument reader 41. The sequencer 51' has its output applied to the wire reproducer 52' and has a transmission starting conductor 127 leading to the transmitter 53. The output from the wire reproducer 52' is passed through a signal generator jack 123 to the communications transmitter 53 which broadcasts signal to the interrogating pilot.

In the operation of the system that is illustrated in Fig. 2 of the accompanying drawings the various instruments in the group of modified weather instruments 40 in a sequential order and timed consecutively by operation of the sequencer 51' apply their outputs as separate readings through the coupling or connector 59' to the wire reproducer 52'. These separate readings are consecutively passed from the wire reproducer 52' to the communications transmitter 53 for transmission as audio modulation of a radio carrier for reception by the interrogating pilot. In this manner the pilot receives in word form and in orderly manner one after the other the readings from each dial of the modified weather instruments 40.

The apparatus and circuit arrangement shown in Fig. 3 of the drawings is illustrative of the circuit shown in Fig. 1 or of the circuit of one of the instruments shown in the group of modified weather instruments 40 in Fig. 2, such as the altimeter setting indicator 50 for example. The circuit shown in Fig. 3 is restricted to that for making a single instrument reading in the interests of simplicity and clarity of presentation. Connections suitable for the transmission of readings from a plurality of instruments, such as those shown in Fig. 2, are shown in Figs. 7 and 8 of the drawings.

In the circuit shown in Fig. 3 a modified altimeter setting indicator 50 is connected through jack-in-plug ground supplying connector 150 to the sequencer 51' and by jack-in-plug connector 59' to a source of audio signal such as a modified wire reproducer 52', or the like. The sequencer 51' is connected to the transmitter 53 by a pair of leads 127 that serve to initiate the operation of the transmitter. The wire reproducer 52' has its output applied through the connector 123 to the communications transmitter 53 for signal transmission to the interrogating pilot. Each cycle of transmission is initiated by the depression of a key or switch 102 in the sequencer 51' and is ended when a cam riser 72 on a sequential cam 70 opens a normally closed relay locking switch 96. The cam 70 is rotated by a motor 93.

The sequencer 51' comprises the cycle starting switch 102, the relay holding relay winding 98 with its associated switches and the motor driving relay winding 104 with its associated switches that start up the transmitter 53 and the motor 93.

The motor 93 drives a wire drum in the reproducer 52' and a sequencer cam 70 in the sequencer 51'. The sequencer cam 70 consecutively actuates the sequential switches 67, 66, 65, etc., in the system during each cycle of operation and finally terminates each cycle by opening the switch 96 and thereby de-energizing the relay holding relay winding 98.

The ground supplying connector 150 between the altimeter setting indicator 50 and the sequencer 51' connects the instrument contact rings 62, 63, and 64 with the corresponding number of ganged sequential switches 67, 66, and 65, respectively, to which a common ground is applied when the ground switch 97 is closed.

During a cycle the sequential cam 70 consecutively closes a desired plurality of normally open sequential switches in the sequencer 51'. Of these sequential switches, the three switches 65, 66 and 67 serving three ring contacts 64, 63 and 62 of the altimeter setting indicator 50 as a representative instrument, are illustrative. The sequential switches consecutively complete instrument reading circuits through the altimeter 50 and such other instruments as are installed at a particular installation to an instrument reading reproducer, such as the reproducer 52' that causes the instrument readings to be transmitted to the interrogating pilot from the transmitter 53.

The altimeter setting indicator 50 comprises a dial 60 of an electrically insulation material that is calibrated upon its face in a usual manner to read altimeter settings, but that is so modified as to make the calibrations electrically conductive and insulated from each other. The instrument dial 60 has an altimeter setting indicating arm 61 yieldingly supported and rotatably mounted on a spindle 73 at the center of the dial to sweep the instrument readings on the face thereof. The altimeter setting indicating arm 61 is rotatably actuated for indicating barometric pressures by an aneroid capsule, not shown, positioned beneath the dial 60, as a usual form of altimeter needle actuating equipment. The indicator arm 61 carries a plurality of axially extending contacts 80, 81, 82, etc., insulated from the arm and from each other to separately connect individual pairs of instrument reading contacts upon the instrument dial 60.

The instrument dial 60 carries upon its upper face, as a part of the instrument reading equipment and disposed outwardly from its center, a desired plurality of electrically conducting concentric ring contacts 62, 63, 64, etc. Each of these ring contacts has a separate connector leading into the jack-in-plug ground supplying connector 150 between the altimeter setting indicator 50 and the three sequential switches 65, 66, and 67 in the sequencer 51'.

A desired plurality of long sector units contacts, of which the contact 71 indicating 30 inches of mercury atmospheric pressure may be taken as being illustrative, are deposited between and are insulated from the ring contacts 62 and 63 as well as being insulated from each other. In Fig. 3 of the drawings three units contacts are shown and read in clockwise order 28, 29, and 30 inches of mercury atmospheric pressure around the instrument dial 60. The units contact 71 indicates the numeral 0 or 30 inches of mercury and is connected to the zero contact of a ten terminal junction 140 part of the connector 59' between the altimeter setting indicator 50 and the wire reproducer 52'.

Circumferentially within the angular arc subtended by each of the unit contacts reading 28, 29, 30 and 31 inches of mercury are ten tenths contacts reading in tenths of one inch of mercury. Radially outwardly from the units contact 71 and within the same angular sector are ten equal tenths sector contacts, of which tenths sector contacts 75 and 76 are illustrative. The ten shorter tenths contacts are individually of equal length and are positioned between the ring contacts 63 and 64. The tenths contacts are insulated from the ring contacts as well as from each other and are connected to the terminal junction 140. Circumferentially within the angular arc subtended by each of the tenths contacts, of which the tenths contact 75 is illustrative, are disposed ten shorter hundredths contacts of equal circumferential dimension. The hundredths contacts are positioned radially outwardly from the ring contact 64 from which the hundredths contacts are insulated as well as being insulated from each other.

The hundredths contact 77 is illustrative of those within the angular sector of the tenths contact 75 and the hundredths contact 78 is illustrative of a hundredths contact within the angular sector of the tenths contact 76. Each hundredths contact indicates one one-hundredth of one inch of mercury atmospheric pressure.

In short, the units contact 71 describes an arc that is divided outwardly of the units contact 71 into ten equal tenths contacts, of which tenths contacts 75 and 76 are illustrative and each of these tenths contacts is subdivided into ten equal hundredths contacts. The units contacts are between the ring contacts 62 and 63. The tenths contacts are between the ring contacts 63 and 64 and the hundredths contacts are positioned radially outwardly of the ring contact 64 or are outermost on the instrument dial 60.

In the embodiment of the invention shown in Fig. 3 of the accompanying drawings, the single ten terminal junction 140 in the connector 59' has applied thereto all connections from the instrument dial 60. For example, the units contact 71 indicating zero or 30 inches of mercury atmospheric pressure, is connected in common with all other zero indicating contacts on the instrument dial 60 to the zero terminal of the terminal junction 140. The units sector supplying the reading 29 inches of mercury and preceding the units sector 71 in the clockwise sweep of the instrument arm 61, is connected to the terminal 9 in the terminal junction 140 along with the tenths sector contacts representing 28.9, 29.9 and 30.9 inches of mercury and the hundredths contacts indicating 29.09, 28.19, 28.29, etc., 28.09, 29.19, 29.29, etc. and 30.09, 30.19, 30.29, etc. In short, all contacts on the instrument dial 60 are connected to correspondingly numbered contacts at the terminal junction 140. All zeros appearing on the dial 60 are connected to the zero contact on the terminal junction 140; all ones on the dial 60 are connected to the one contact on the terminal junction 140; continuing to all nines on the dial 60 are connected to the nine contact on the terminal junction 140. The sequential operation of relays in the automatic instrument reader 41 to be described hereinafter controls the oral transmission from transmitter 53 of readings from the dial 60.

The instrument dial 60 has a contact making beam 85 extending diametrically thereacross and normally spaced upwardly therefrom as well as from the instrument indicating arm 61. One end of the indicating beam 85 is attached by hinge 86 to a suitable instrument mounting. The contact making instrument beam 85 preferably is expanded between its ends in a ring portion 87 that is dimensioned to overlie the instrument reading indicating arm 61 equidistantly upon both sides of its spindle mount 73. The instrument indicator arm 61 is normally yieldingly supported upwardly from the altimeter dial 60 so that it is caused to sweep freely and circumferentially above the contact calibrations on the instrument dial 60 by means of a low torque operating mechanism in response to changes in barometric pressure at the ground level where the instrument is positioned. An unattached end 91 of the beam 85 is positioned above a solenoid relay 90.

Upon the energization of the winding 89 of the solenoid relay 90 the unattached beam end 91 is attracted so that the beam 85 is depressed toward the instrument dial 60. When so depressed, the beam ring portion 87 engages the indicator arm 61 on both sides of its point of support against upwardly directed spring pressure and thereby causes the contacts 80, 81 and 82 carried by the arm 61 to separately make connection between the ring contacts 62, 63 and 64 and the next calibration indicating contact that is radially outwardly therefrom.

The energization of the winding 89 of the relay 90 is accomplished from a B+ power source 88 upon the application of ground thereto through the lead 83 and the closed sequential switches 65, 66, and 67 for accomplishing the sustained engagement of the three separate contacts 80, 81 and 82 carried by the indicator arm 61 during the transmission of a reading from the instrument dial 60 to the interrogating pilot.

Ground is applied to the solenoid relay winding 89 over the lead 83 with the closing of the three sequential switches 65, 66 and 67 when the ground switch 97 in the sequencer 51' is closed. The sequential switches 67, 66 and 65 are consecutively closed in a predetermined order through their engagement with the cam riser 72 of the sequencer cam 70 upon the closing of the cycle starting switch 102 in the sequencer 51'.

The sequencer cam 70 also engages the relay locking switch 96 that is normally closed at the end of each complete rotation. The sequencer cam 70 is mounted on a shaft 94 rotated by the motor 93. The motor 93 through another shaft 95 also operates a wire drum, not shown, within the wire reproducer 52'. The motor 93 runs when motor actuating switch 92 is closed to connect power supply 151 with the field winding of the motor 93.

The motor energizing switch 92 is ganged with switches 97 and 99. The closing of switch 97 connects ground return to the sequencer switches 65, 66, 67, etc. The closing of the switch 99 energizes the transmitter 53 from a power source, not shown, over the pair of leads 127. The closing of the switch 97 grounds instrument ring contacts 62, 63 and 64 through connector 150 and supplies ground to the winding 89 of the relay 90 over a conductor 83, as shown in Figs. 3 and 5 of the drawings.

The energization of the relay winding 89 from B+ power source 88 imparts electromagnetic properties to the solenoid relay 90 such that it attracts as an armature, the unattached end 91 of the instrument beam 85 against the yielding resistance of upwardly directed spring pressure. The upwardly directed spring pressure supports the beam 85 out of contact with the instrument arm 61 to permit the unimpeded movement of the instrument arm 61 with respect to both the beam 85 and the contact calibrations on the dial 60. The depression of the unattached end 91 of the beam 85 around the hinge 86 as a center of rotation, depresses the ring 87 part of the beam 85 against the indicator arm 61. The depression of the indicator arm 61 causes the separate contacts 80, 81 and 82 to individually engage pairs of calibration contacts on the instrument dial 60 such as, for example, the ring 62 and the units contact 71, the ring 63 and the tenths contact 76, and the ring 64 and the hundredths contact 78, respectively.

The relay locking switch 96 is normally spring pressed closed in its engagement with the cam 70, until it is opened by the cam riser 72, once at the end of each rotation of the cam 70 to terminate an operative cycle of the device. The switch 96 is connected with a rider engaging the peripheral surface of the cam 70 at a peripheral location so that the relay locking switch 96 remains closed until the cam riser 72 lifts the rider and momentarily opens the switch 96. The three sequential switches 65, 66 and 67 are similarly connected with three separate riders engaging the peripheral surface of the cam 70 at peripheral locations spaced from each other and from that connected with the switch 96, so that in point of time the switch 96 is closed then switch 67 is closed long enough for the device to transmit the altimeter units reading, then switch 66 is closed long enough for the device to transmit the altimeter tenths reading, and then the switch 65 is closed long enough for the device to transmit the altimeter hundredths reading. The switch 96 has one terminal connected to a terminal of a relay switch 100 and its other terminal connected to one end of a solenoid relay winding 98. The relay winding 98 is energized from a power source 101. The relay winding 98 is initially energized from the power source 101 by the depression of the normally open cycle starting key or switch 102.

The temporary closing of the key or switch 102 supplies a potential from the power source 101 across the relay winding 98 to close the switches 100 and 103. The closing of the switch 100, with the switch 96 in its normally closed position, continues the energization of the relay winding 98 after the subsequent release and opening of the spring released switch 102. The switch 103 is maintained closed upon and after the closing of the switch 102. The closure of the switch 103 supplies a ground return to the B+ potential power source 105 through and hence maintains energized the relay winding 104. The switch 103 serves as a holding switch for maintaining closed the switches 92, 97 and 99 during the time period between the closing of the switch 102 and the opening of the switch 96 by operation of the riser 72 on the cam 70.

The cycle starting key 102 may be operated at the ground station manually by a human operator at the ground station when a homing pilot transmits a signal requesting information that is provided by the instruments of the present device. Within the scope of the present invention the cycle starting key 102 may be operated from the air and without the intervention of a human operator at the ground station. The interrogating pilot may send a triggering signal of a predetermined frequency to energize an electromagnet or relay winding, such as the winding 89 of the relay 90, to attract the key or switch 102 in the same manner in which the relay 90 attracts as an armature the unattached end 91 of the upwardly spring pressed beam 85 part of the altimeter setting indicator 50.

One complete rotation of the sequential cam 70 determines one cycle for the device. At the start of each cycle the switches 92, 97, 99, 100, 103 and 96 are closed and the sequential switches 65, 66, 67 etc. are open. During each cycle the motor 93 is rotating the sequential cam 70 and the cam riser 72 is consecutively and momentarily closing the sequential switches 67, 66, 65 etc. At the end of each cycle the sequential cam riser 72 opens momentarily the switch 96 which deenergizes the solenoid relay windings 98 and 104, opening the associated switches and stopping the motor 93. At the end of each cycle the sequential cam riser 72 passes beyond the switch 96 so that the switch 96 again closes preparatory to the starting of another cycle when the starting key 102 is again closed.

The wire reproducer 52' may be taken as being illustrative of suitable equipment for applying an audio modulation signal to a carrier emitted from the transmitter 53. The wire reproducer 52' comprises a B+ power source 124 applied in parallel to a plurality of relay windings of which the relay windings 114, 115 and 118, corresponding to the numerals 0, 1 and 7 on the terminal junction 140, may be taken as being representative.

Electrical power from the source 124 is maintained upon the relay windings 114, 115 and 118, upon the corresponding contacts of the terminal junction 140 in the connector 59' and upon the corresponding 0, 1 and 7 contacts on the instrument dial 60. When the switch 97 is closed and the beam 61 is depressed this power flows successively through the relay windings, the connector 140, the contacts on the instrument dial 60, the contacts 80, 81 and 82 carried by the instrument indicator arm 61, and through the connector 150 to the sequential switches 65, 66 and 67 from which it is continued along the connector 74 and through the switch 97 to ground. The sequential order in which ground is applied through switch 97 and the above mentioned connections to the relay windings 114, 115 and 118, is that in which the cam riser 72 engages and successively closes the sequential switches 67, 66 and 65.

The reproducer 52' comprises a plurality of relay windings 114, 115, 118 etc. separately actuating switches 110, 116, 119 etc., respectively. The switches 110, 116, 119 etc. are in circuit with wire reproducer pick up heads 113, 117, 120 etc., respectively, that are coupled for applying audio modulation to a carrier emitted by the transmitter 53 in a desired manner, as by means of a signal generator 111 and an inductive winding 122 that is attached to the transmitter 53 by a conductor 123, or the like.

In the operation of the reproducer 52' the successive energization of the relay windings 114, 115, 118 etc., on the application of ground thereto through the altimeter instrument 50 and sequencer 51', successively closes the associated switches 110, 116, 119 etc., respectively. The consecutive closing of the switches 110, 116, 119 etc., successively causes the wire recorder pick up heads 113, 117, 120 etc. to play back signal through the signal generator 111 and inductive coupling 122 for application as audio modulation upon a carrier from the transmitter 53 for interception of the homing pilot.

The operation of the device as illustrated in Fig. 3 of the drawings, is initiated in the sequencer 51' by the depression of the sequencer starting key 102, either manually or upon the arrival of a relay operating signal in known manner, as preferred. The release of the key 102 from its closed to its open position does not interrupt the energization of the solenoid relay winding 98 from the power source 101 during a complete cycle of the sequencer cam 70 since the closed switch 96 serves as a holding switch for continuing the energization of the solenoid relay winding 98. The switch 103 serves as a holding switch to maintain ground for the other solenoid relay winding 104 to which power from a power source 105 is applied as long as the switches 96 and 103 remain closed. The energization of the electromagnetic winding 104 closes the ganged switches 92, 97 and 99.

The closing of the switch 92 connects the power supply 151 across the field winding of the motor 93 causing it to start up. The operation of the motor 93 continues during any one cycle of operation and turns the sequential cam 70 through the shaft 94 and turns wire drums in the wire reproducer 52' through the shaft 95. The switches 92, 97, 99, 100 and 103 remain closed during each rotation of the cam 70 with operative results that have been described previously. The closing of switch 99 causes the transmitter to transmit signal during one complete rotation of the sequencer cam 70. The sequential switches 65, 66, 67 etc. are normally open and are sequentially closed and grounded with the successive closing of the switches by operation of the sequencer cam 70. The winding 89 of the solenoid relay 90 is continuously energized in a similar manner and causes the contacts 80, 81 and 82 to be clamped down by the ring part 87 of the beam 85 against any three particular conductors over which the instrument arm 61 is then positioned by operation of the atmospheric pressure at ground level when the cycle starting key is closed.

The illustrative setting shown in Fig. 3 of 30.17 inches of mecury barometric pressure at ground level is assumed empirically. As the sequential cam 70 begins to revolve, the cam riser 72 closes the sequential switch 67. The closing of the switch 67 applies ground from the conductor 74 and the switch 97 to the ring conductor 62, the contact 80, the units contact 71, the zero contact of the terminal junction 140, and the relay winding 114 to the power source 124. The resulting energization of the relay winding 114 causes the switch 110 to close. The closing of the relay switch 110 causes the wire reproducer zero pick up head 113, through the signal generator 111 and pick up inductive winding 122 to cause to be transmitted to the homing pilot from the transmitter 53 the audio signal "0." The signal "0" indicates to the interrogating pilot that the barometric pressure at ground level at the field to which he is homing to the nearest units digit reading is 30 inches of mercury.

The riser 72 on the sequencer cam 70 will then close the switch 66 and permit the switch 67 to again open. The closing of the switch 66 then applies ground to the ring contact 63 on the instrument dial 60. The application of ground to the ring contact 63, against which the connector 81 carried by the indicator arm 61 is pressed, applies ground to the tenths contact 76 and thereby, through the contact "1" of the terminal junction 140, to the relay winding 115 through which B+ power is supplied from the power source 124. The energization of the relay winding 115 closes the switch 116 and thereby energizes the "1" wire reproducer head 117 and, through the couple comprising the signal generator 111 and the inductive winding 122, causes the word "one" to be transmitted from the transmitter 53 to the interrogating pilot.

The riser 72 on the sequencer cam 70 next closes the switch 65 and permits the switch 66 to open. Closing switch 65 applies ground to the contact 82 on the instrument beam 61, to the hundredths contact 78 on the instrument dial 60, to the contact "7" of the connector 140 and through the relay winding 118 to close the reproducer relay switch 119. On the resultant energization of the wire reproducer pick up head 120, the word "seven" is emitted from the transmitter 53 and is received by the homing pilot. The described transmission informs the interrogating pilot that the barometric pressure at the ground station to which he is approaching is 30.17 inches of mercury.

The above described operation continues to open such sequential switches as are added to the switches 65, 66 and 67 to thereby initiate the transmission of additional matters of information until such time as the rotation of the sequencer cam 70 opens the normally closed relay locking switch 96 and thereby interrupts the energization of the relay winding 98.

The interruption of the energization of the winding 98 interrupts the circuit through winding 104 opening the switches associated with both relay windings. The opening of the switch 92 stops the rotation of the motor 93. The opening of the switch 97 interrupts ground return to the sequential switches 65, 66, 67 etc. and to the solenoid relay winding 89. The opening of the switch 99 interrupts the energization of the transmitter 53. The de-energization of the solenoid relay winding 89 permits the upwardly spring pressed beam 85 to rise out of engagement with the instrument indicator arm 61. The instrument arm 61 so released is again free to sweep the scale on the instrument dial 60 in response to changes in barometric pressure at ground level.

The simplified sequential relationship and operation of the device as applied to the transmission to the interrogating pilot of the three words "zero," "one," and "seven" as described in connection with Fig. 3 of the accompanying drawings, is elaborated upon somewhat in Fig. 7. The circuits indicated in Fig. 7 comprises those of the sequencer 51' and the wire reproducer 52'. In the sequencer 51' part of Fig. 7 an illustrative plurality of sequential switches engaged by the riser 72 of the sequential cam 70 in consecutive order is illustrated by the sequential switches indicated by the letters a to s, inclusive, that are closed in their alphabetical order. Of these switches, that indicated by the letter s is the switch 96 in Fig. 3 and is maintained in closed condition until the end of a cycle of the device. The depression of the cycle starting key 102 results in the energizing of the relay windings 98 and 104 that holds closed the associated switches during the cycle so initiated. Closing of the switch 92 applies the potential of power source 151 to the motor 93 and thereby accomplishes the rotation of the sequencer cam 70 and the wire drum in the reproducer 52'. The resulting circuit associations are substantially a duplicate of those recited for the operation of the circuit shown in Fig. 3 but of increased complexity in that the energization of the relay winding 104 closes the switch 97 and applies ground to the lead 74 connected to one contact of each of the switches d, e, f, h, i, k, m, n, o, q, and r.

The sequential switches a to s, inclusive, in Fig. 7 are immovably mounted around the rotatable sequencer cam 70 in a predetermined order and time interval relationship with respect to each other, as indicated in Fig. 6. The sequencer switches a to s, respectively, are arranged spacially with respect to the sequencer cam 72 as indicated by the letters along the circumference of the cam 70, as shown in Fig. 6. The sequencer cam 70 engages in alphabetical order switches a to r, inclusive, in applying a number of audio modulations to the carrier in the transmitter 53 with each rotation of the sequencer cam 70 and terminates a cycle by opening switch s. In Fig. 7 the connector 123 is applied to the transmitter 53 and the connector 59'' is applied to an instrument, such as the altimeter 50. The remaining connectors 150, 155, 156, 157 and 158 from the sequencer 51' are applied to correspondingly numbered primed connectors in Fig. 8. The primed connectors in Fig. 8 are connected with calibration contacts on instruments in the modified weather instruments 40 group shown in Fig. 2.

A more detailed showing of a plurality of instrument electrical connections for the modified weather instruments represented in Fig. 2 is shown in Fig. 8 of the drawings. In Fig. 8 all of the same numbers referring to instrument reading are connected to the same connector or plug-in-jack 59'. In Fig. 8 the altimeter calibrations are designated to conform with the correspondingly numbered contacts carried by the altimeter setting indicator arm 61 in Fig. 3 but primed in Fig. 8. With reference to the altimeter in Fig. 8 the contact 80' is in units corresponding in Fig. 3 to 28, 29, and 30 inches of mercury, the tens places not being indicated since all altimeter readings at ground level would be within this range. The altimeter contact 81' is in tenths of an inch of mercury and the altimeter contact 82' is in hundredths of an inch mercury atmospheric pressure. The connector jack 59' conforms with the connector jack 59' in Figs. 2 and 3. The three contacts designated by the letters C, U, G conform with "clear ceilings," "unlimited visibility" and "gusty winds," respectively, as indicated in Fig. 8. The altimeter contacts are grounded through leads to conductor 150 applied to sequencer 51' as described for Fig. 2.

In following through an illustrative sequence for one cycle of the sequencer cam 70 applied to Figs. 7 and 8, the cam riser 72 consecutively closes the sequencer switches a to r, inclusive, in alphabetical order and opens the last switch s or 96 to terminate the cycle. When switch 144 or a of the alphabetical sequence is closed by operation of the cam 70, the wire reproducer pick up head 141 is connected into the wire reproducer play back circuit and causes to be emitted from the transmitter 53 the name of the site or airport where the beacon that is contacted by the interrogating pilot is located. Where the name of the airport so recorded on the magnetic tape is Wright Field, then the carrier from the transmitter 53 is audio modulated by the words "Wright Field" and the pilot hears these words in his ear phones as the riser 72 on the sequencer cam 70 closes the sequential switch 144 or a.

The sequencer cam riser 72 next closes the switch 145 or b. The closing of the switch 145 or b energizes the wire reproducer head 142 and plays back the word "weather" which is then heard by the interrogating pilot. The sequencer cam riser 72, as the cam 70 continues to rotate, next closes switch 146 or c. The closing of the switch 146 or c energizes wire reproducer pick up head 143 to play back the word "altimeter."

Continuing this rotation, the sequencer cam riser 72 next consecutively closes the switches 67, 66, and 65 or d, e, f, respectively, in that order, thereby playing back the readings in units, tenths and hundreths numbers of the reading upon the altimeter weather indicator 50 indicated in Fig. 8 as 80', 81' and 82' respectively. As shown in Fig. 3 of the drawings, the words "zero, one, seven" would be played back and are then heard by the interrogating pilot in his ear phones. The numerical details of illustrative instrument connections are shown in Fig. 8 of the drawings as modified weather instruments.

In continuing this rotation, the riser 72 of the sequencer cam 70 next consecutively closes the switches g to r inclusive, that report to the interrogating pilot the ceiling, visibility, wind speed and wind direction readings at the ground level of the beacon or the airport so interrogated. With the closing of the sequential switch g the word "ceiling" is transmitted from the transmitter 53. With the closing of the ceilometer switches h and i the reading from a ceilometer instrument comparable with the altimeter shown in Fig. 3 and connected in a circuit arrangement indicated in Fig. 8 of the drawings is applied as audio modulation on the carrier emitted by the transmitter 53. The closing of the ceilometer sequential switch h applies modulation taken from the tens chart 130 in Fig. 8 of the drawings as tens of hundreds of feet ceiling and the reading transmitted as carrier modulation on the closing of sequential switch i is taken from the units chart 131 in Fig. 8 as hundreds of feet ceiling from ground level. The word "clear" indicated in Fig. 8 is applied through connector 59' to the reproducer 52' when it is clear at ground level.

In a similar manner the closing of the sequential switch j announces the word "visibility" in the ear phones of the homing pilot and the closing of the sequential switch k transmits the visibility at ground level in miles from the instrument chart 132 or that visibility is unlimited as indicated in Fig. 8.

The closing of the sequential switch l announces the words "wind speed" to the homing pilot. The closing of the sequential switches m, n, o in that order announce readings taken from the chart 135 in tens of miles per hour, from the chart 136 in miles per hour and from the chart 134 the word "gusty" where such is the fact at ground level, and in that respective order. The closing of the sequential switch p causes the words "wind direction" to be received by the homing pilot in his head phones in tens of degrees from the instrument chart 137 and in units of degrees taken from the instrument chart 138 upon the closing of sequential switches q and r respectively.

The sequential switches a to s, inclusive, are so spaced around the circumference of the circle through which the sequential cam riser 72 rotates as to cause pauses in the transmission of information which substantially correspond to pauses normal to human speech. Thus, the words which the pilot hears when the sequential switches a to f inclusive, are closed by operation of the sequencer cam 70 in the illustrative installation disclosed herein are "Wright Field weather," pause, "altimeter," pause, "zero, one, seven," pause. The sequence continues through a desired number of announcements and stops automatically when the normally closed switch s or 96 at the end of sequence is opened.

The last of the sequential switches contacted by the cam riser 72 is the switch 96 or s which is then opened from its normally closed position. The opening of the switch 96, as elsewhere described herein, interrupts the energization of the solenoid windings 98 and 104 and thereby terminates one cycle of the sequential cam 70. When so terminated, the cam riser 72 passes from beneath the switch 96 so that the switch 96 is again closed preparatory to the starting of the next cycle upon the next closing of cycle initiating key 102.

It will be apparent that substantially any information of a recurrent nature and which may be set up on a key board and adapted for sequential telemetering may be transmitted by the equipment that is disclosed herein. In reading from an instrument, such as that shown in Fig. 3 of the accompanying drawings, it will be noted that the connection of all members of the decimal system there used may be connected in the conductor 59' by the use of ten wires and that but three wires lead from the instrument dial to the connector 150. It will be apparent therefore that sequential telemetering is accomplished in the disclosed installation with the use of a minimum number of wires. It will be further noted in the disclosed adaptation of the present invention when sequential telemetering is accomplished for a wide range of information the use of standard transmitter and receiving devices is practical. Audio carrier modulation for the transmission of intelligence in the disclosed adaptation of the present invention is preferred and is fixed, since spoken words minimize observation errors in making instrument readings and in the interpretation of such readings at remote points. Automatic telemetering by voice eliminates the need for specially trained observers at the reception point to decode the telemetered information.

In addition to the particular use that is presented illustratively herein it will be apparent that the present invention is adapted for being applied to radiosonde instruments; to automatic weather stations; to ground control approach radio and the like wherein a plurality of digits, words or combinations of words, are required to be telemetered to remote points or to be announced automatically. The disclosed invention is adapted for more prosaic use in the announcing of station names in airplanes, trains, busses, and the like; in the automatic announcing of floors and associated recurrent information in the elevators of department stores, other business buildings and the like; and in warning devices either by radio or telephone for automatic voice transmission from burglary, fire alarms or the like, to be intercepted at a watch station that is to be informed of the exact location and nature of the danger.

It is to be understood that the detailed presentation shown in the accompanying drawings and described through sequential circuit connections has been submitted for the purposes of illustrating and explaining and operative embodiment of the present invention and that similarly operating instrument adaptations may be substituted therefore without departing from the scope of the present invention.

What I claim is:

1. An intelligence transmitting radio system, comprising the combination of a transmitter for transmitting radio signals, an instrument supplying intelligence to be transmitted by said transmitter, an instrument scale of fixed separately insulated instrument calibrating circuit contacts as part of said instrument, an upwardly spring pressed instrument indicator arm adapted for freely sweeping said instrument scale fixed contacts and bearing a contact for connecting said instrument scale contacts in pairs to provide intelligence from the operation of said instrument by the forceable depression against the spring pressure of said indicator arm downwardly against said fixed contacts for completing a circuit therebetween, an instrument beam for keeping the contact on the instrument indicator arm into engagement with said fixed contacts of said instrument during the transmission of intelligence therefrom, an instrument solenoid attracting at least one end of said instrument beam as an armature to make the connection between the instrument scale contacts and the contact on said instrument indicator arm, a sequencer determining the order and timing of the transmission of intelligence supplied by said instrument from the engagement of the instrument indicator arm carried contact with the instrument fixed contacts, and means for applying upon a carrier from said transmitter an audio modulation signal initiated at the engagement by the contact on said instrument indicator arm with said fixed contacts of said instrument in an order and timing controlled by said sequencer.

2. An electrically operated automatic intelligence transmitting means serving to supply ground station information to an airborne interrogator upon receiving an interrogating signal therefrom, comprising the combination of a sequencer, a cycle starting switch in said sequencer that is closed to start a sequence of signal transmissions in response to the interrogating signal from the airborne interrogator, a holding relay winding in said sequencer and energized by said cycle starting switch, a motor driving relay winding in said sequencer and energized by the energization of said holding relay winding, a plurality of sequential switches in said sequencer and to which ground is consecutively applied from said motor driving relay winding, a rotatable cam in said sequencer separately and sequentially actuating said plurality of sequential switches, a motor energized upon the energization of the motor driving relay winding in said sequencer to turn the cam therein for consecutively operating the sequential switches therein and ultimately terminating the sequence of signal transmissions, an instrument for supplying intelligence, an instrument dial, a plurality of circularly discontinuous sector contacts on said instrument dial and insulated from each other, a plurality of circularly continuous contact rings on said instrument dial and insulated both from each other and from said discontinuous sector contacts, a rotatable instrument indicator arm mounted for rotation centrally of said instrument dial, spring means supporting said instrument arm up out of engagement with the instrument dial contacts for the unimpaired sweeping of said arm thereover, an arm contact carried by said instrument indicator arm and adapted for connecting a dial sector contact with a dial contact ring upon the spring opposed depression of said arm, a contact making instrument beam depressed upon the closing of one of said sequential switches for causing the depression of the instrument arm against the yielding resistance of said arm supporting spring means and accomplishing the electrical engagement of the arm contact with a sector contact and a contact ring, a multiple terminal instrument junction to which all numeral indicating contacts on the instrument dial are connected electrically, reproducer means connected electrically to and receiving the output from the multiple terminal instrument junction and actuated mechanically from said motor, and transmitter means started and stopped by the sequencer motor driving relay winding and connected electrically with the reproducer means for transmitting orally datum readings from said instrument.

3. A radio signal transmission system, comprising a transmitter, a data supplying instrument connected with said transmitter, a dial on said instrument, a plurality of instrument contacts indicating the calibration of said instrument dial, a contact bearing instrument arm freely sweeping the contacts on said instrument dial and adapted to be depressed thereagainst for the providing of data for radiation from said transmitted, a beam overlying said instrument arm, a sequencer controlling the starting, the sequential order and the stopping of the transmission of data from the system during a cycle of operations, a cycle starting key in said sequencer for starting a data transmitting cycle, a solenoid relay energized with each closing of said cycle starting key for depressing said instrument beam on said instrument arm, a plurality of sequencer switches in said sequencer individually connected to said solenoid relay and to said instrument dial contacts, a sequencer cam successively actuating said sequencer switches, a motor driving said sequencer cam continuously during each data transmitting cycle, and a signal generator supplying to said transmitter a carrier modulated by signal from said instrument contacts engaged by the contacts on said instrument arm.

4. An electrically operated automatic intelligence transmitting means serving to supply ground station information to an airborne interrogator upon receiving an interrogating signal therefrom, comprising the combination of a sequencer, a cycle starting switch in said sequencer that is closed to start a sequence of signal transmissions in response to the interrogating signal from the airborne interrogator, a holding relay winding in said sequencer and energized by said cycle starting switch, a motor driving relay winding in said sequencer and energized by the energization of said holding relay winding, a plurality of sequential switches in said sequencer and to which ground is consecutively applied from said motor driving relay winding, a rotatable cam in said sequencer separately and sequentially actuating said plurality of sequential switches, a motor energized upon the energization of the motor driving relay winding in said sequencer to turn the cam therein for consecutively operating the sequential switches therein and utimately terminating the sequence of signal transmissions, an instrument for supplying intelligence, an instrument dial, a plurality of circularly discontinuous sector contacts on said instrument dial and insulated from each other, a plurality of circularly continuous contact rings on said instrument dial and insulated both from each other and from said discontinuous sector contacts, a rotatable instrument indicator arm mounted for rotation centrally of said instrument dial, spring means supporting said instrument arm up out of engagement with the instrument dial contacts for unimpaired sweeping of said arm thereover, an arm contact carried by said instrument indicator arm and adapted for connecting a dial sector contact with a dial contact ring upon the spring opposed depression of said arm, a contact making instrument beam depressed upon the closing of one of said sequential switches for causing the depression of the instrument arm against the yielding resistance of said arm supporting spring means and accomplishing the electrical engagement of the arm contact with a sector contact and a contact ring, a multiple terminal instrument junction to which all numeral indicating contacts on the instrument dial are connected electrically, reproducer means actuated mechanically from said motor and selectively connected electrically to and receiving the output from a plurality of wire reproducer pick-up heads and from the multiple terminal instrument junction, and transmitter means started and stopped by the sequencer motor driving relay winding and connected electrically with the reproducer means for transmitting orally statements from said wire reproducer pick-up heads and datum readings from said instrument.

5. An electrically operated automatic intelligence transmitting means serving to supply ground station information to an airborne interrogator upon receiving an interrogating signal therefrom, comprising the combination of a sequencer, a cycle starting switch in said sequencer that is closed to start a sequence of signal transmissions in response to the interrogating signal from the airborne interrogator, a holding relay winding in said sequencer and energized by said cycle starting switch, a motor driving relay winding in said sequencer and energized by the energization of said holding relay winding, a plurality of sequential switches in said sequencer and to which ground is consecutively applied from said motor driving relay winding, a rotatable cam in said sequencer separately and sequentially actuating said plurality of sequential switches, a motor energized upon the energization of the motor driving relay winding in said sequencer to turn the cam therein for consecutively operating the sequential switches therein and ultimately terminating the sequence of signal transmissions, an instrument for supplying intelligence, an instrument dial, a plurality of circularly discontinuous sector contacts on said instrument dial and insulated from each other, a plurality of circularly continuous contact rings on said instrument dial and insulated both from each other and from said discontinuous sector contacts, a rotatable instrument indicator arm mounted for rotation centrally of said instrument dial, spring means supporting said instrument arm up out of engagement with the instrument dial contacts for the unimpaired sweeping of said arm thereover, an arm contact carried by said instrument indicator arm and adapted for connecting a dial sector contact with a dial contact ring upon the spring opposed depression of said arm, an instrument beam depressed upon the energization of one of said sequential switches to close circuit between one of said continuous contact rings with one of said discontinuous contacts on the instrument dial, a multiple terminal connector to which said electrical contacts are connected, and a transmitter for transmitting through said terminal connector intelligence from said instrument contacts.

6. An electrically operated automatic intelligence transmitting means serving to supply ground station information to an airborne interrogator upon receiving an interrogating signal therefrom, comprising the combination of a sequencer, a cycle starting switch in said sequencer that is closed to start a sequence of signal transmissions in response to the interrogating signal from the airborne interrogator, a holding relay winding in said sequencer and energized by said cycle starting switch, a motor driving relay winding in said sequencer and to which ground is consecutively applied from said motor driving relay winding, a rotatable cam in said sequencer separately and sequentially actuating said plurality of sequential switches, a motor energized upon the energization of the motor driving relay winding in said sequencer to turn the cam therein for consecutively operating the sequential switches therein and ultimately terminating the sequence of signal transmissions, an instrument for supplying intelligence, an instrument dial, a plurality of circularly discontinuous sector contacts on said instrument dial and insulated from each other, a plurality of circularly continuous contact rings on said instrument dial and insulated both from each other and from said discontinuous sector contacts, an instrument arm selectively connecting said discontinuous sector contacts with said continuous contact rings, a plurality of electrical contacts indicating information associated with information from said instrument contacts, a multiple terminal connector to which said contacts are connected, and transmitter means radiating signal from said connector.

7. An electrically operated automatic intelligence transmitting means serving to supply ground station information to an airborne interrogator upon receiving an interrogating signal therefrom, comprising the combination of a sequencer, a cycle starting switch in said sequencer that is closed to start a sequence of signal transmissions in response to the interrogating signal from the airborne interrogator, a holding relay winding in said sequencer and energized by said cycle starting switch, a motor driving relay winding in said sequencer and energized by the energization of said holding relay winding, a plurality of sequential switches in said sequencer and to which ground is consecutively applied from said motor driving relay winding, a rotatable cam in said sequencer separately and sequentially actuating said plurality of sequential switches, a motor energized upon the energization of the motor driving relay winding in said sequencer to turn the cam therein for consecutively operating the sequential switches therein and ultimately terminating the sequence of signal transmissions, an instrument for supplying intelligence, a plurality of instrument electrical contacts indicating instrument readings, a contact bearing depressible instrument hand engaging said instrument electrical contacts, means for depressing said instrument hand, a plurality of electrical contacts indicating information associated with information from said instrument contacts, a multiple terminal connector to which said electrical contacts are connected, and transmitter means radiating signal from said connector.

DAVID ATLAS.

REFERENCES CITED

The following references are of record in the file of this patent:

UNITED STATES PATENTS

| Number | Name | Date |
|---|---|---|
| 835,840 | Strassweg | Nov. 13, 1906 |
| 1,146,486 | Durr | July 13, 1915 |
| 1,530,363 | Hayden | Mar. 17, 1925 |
| 1,673,369 | Mills | June 12, 1928 |
| 1,913,511 | Reynolds | June 13, 1933 |
| 1,931,091 | Smith | Oct. 17, 1933 |
| 1,967,778 | Myers | July 24, 1934 |
| 1,972,289 | Chauveau | Sept. 4, 1934 |
| 2,047,900 | Bruckel | July 14, 1936 |
| 2,224,244 | Hicks | Dec. 10, 1940 |
| 2,444,106 | Miles | June 29, 1948 |
| 2,444,818 | Franklin | July 6, 1948 |